(12) United States Patent
Peng et al.

(10) Patent No.: US 12,547,205 B2
(45) Date of Patent: Feb. 10, 2026

(54) PHOTONIC COMPUTING SYSTEM

(71) Applicant: Shanghai Xizhi Technology Co., Ltd, Shanghai (CN)

(72) Inventors: Bo Peng, Shanghai (CN); Arash Hosseinzadeh, Shanghai (CN); Yelong Xu, Shanghai (CN); Huaiyu Meng, Shanghai (CN); Yichen Shen, Shanghai (CN)

(73) Assignee: SHANGHAI XIZHI TECHNOLOGY CO., LTD., Shanghai (CN)

( * ) Notice: Subject to any disclaimer, the term of this patent is extended or adjusted under 35 U.S.C. 154(b) by 437 days.

(21) Appl. No.: 18/156,402

(22) Filed: Jan. 19, 2023

(65) Prior Publication Data

US 2023/0236621 A1    Jul. 27, 2023

(30) Foreign Application Priority Data

Jan. 21, 2022    (CN) .......................... 202210073444.2

(51) Int. Cl.
| | |
|---|---|
| G06E 1/00 | (2006.01) |
| G02F 3/00 | (2006.01) |
| G02F 3/02 | (2006.01) |
| G06E 1/04 | (2006.01) |

(52) U.S. Cl.
CPC ................. *G06E 1/00* (2013.01); *G02F 3/00* (2013.01); *G02F 3/024* (2013.01); *G06E 1/045* (2013.01)

(58) Field of Classification Search
None
See application file for complete search history.

(56) References Cited

U.S. PATENT DOCUMENTS

| | | | |
|---|---|---|---|
| 11,507,818 B2 | 11/2022 | Hosseinzadeh et al. | |
| 2022/0215257 A1* | 7/2022 | Shen | ......................... G02F 1/00 |

FOREIGN PATENT DOCUMENTS

| | | |
|---|---|---|
| CN | 113159305 A | 7/2021 |
| CN | 113159306 A | 7/2021 |

OTHER PUBLICATIONS

Taiwanese Office Action issued in corresponding Taiwanese Patent Application No. 112102460 dated Aug. 24, 2023.
Taiwanese Notice of Allowance issued in corresponding Taiwanese Patent Application No. 112102460 dated Nov. 29, 2023.

* cited by examiner

*Primary Examiner* — Dung T Nguyen
(74) *Attorney, Agent, or Firm* — PV IP PC; Wei Te Chung

(57) ABSTRACT

The present disclosure relates to a field of photonic computing and provides a photonic computing system including: a photonic computing unit configured to receive a first plurality of optical signals, wherein the first plurality of the optical signals represent a first set of values respectively. The photonic computing unit includes a plurality of weight modules, the weight modules represent a plurality of predetermined values respectively, and each of the weight modules corresponds to one of the predetermined values. Each of the weight modules includes: an optical input part configured to receive one optical signal of the first plurality of the optical signals, and at least one directional coupler. The weight module corresponds to one of the predetermined values to achieve the multiplication operation.

11 Claims, 7 Drawing Sheets

PHOTONIC COMPUTING SYSTEM

CROSS-REFERENCE TO RELATED APPLICATIONS

This application claims priority to Chinese Patent Application No. 202210073444.2 filed on Jan. 21, 2022. The entire disclosures of the above application are hereby incorporated by reference.

TECHNICAL FIELD

The present disclosure relates to a field of photonic computing, and particularly relates to a photonic computing system and a photonic computing unit.

BACKGROUND

In fields such as artificial intelligence and science computations, some computations require a great amount of matrix operations, which highly demands computing powers of processor chips. Processors exclusively for matrix operations have been developed based on graphics processing units (GPUs), field programmable gate arrays (FPGAs). The above chips, in physical implementation, are mainly an integrated circuit composed of complementary metal-oxide-semiconductor (CMOS) transistors.

At present, photonic computing has been set out for the above computations.

SUMMARY

An embodiment of the present disclosure provides a photonic computing system, comprising: a photonic computing unit configured to receive a first plurality of optical signals, wherein the first plurality of the optical signals represent a first set of values respectively. The photonic computing unit includes a plurality of weight modules, the weight modules represent a plurality of predetermined values respectively, and each of the weight modules corresponds to one of the predetermined values. Each of the weight modules includes: an optical input part configured to receive one optical signal of the first plurality of the optical signals, and at least one directional coupler, wherein each of the at least one directional coupler is designed to implement a predetermined split ratio, and/or at least one multimode interference coupler (MMI), and each of the at least one MMI is designed to implement a predetermined split ratio such that the weight module corresponds to one of the predetermined values and is configured to implement a multiplication operation of one value corresponding to one optical signal inputted by the optical input part and one predetermined value corresponding to one weight module.

In some embodiments, the at least one directional coupler and/or the at least one MMI in a manufacturing stage is configured to have a split ratio relating to the predetermined value of the weight module according to the predetermined value corresponding to the weight module.

In some embodiments, the system further comprises an optical encoding unit, and the optical encoding unit is configured to encode and generate the first plurality of the optical signals according to the first set of the values.

In some embodiments, the system further comprises a plurality of copying modules configured to copy at least one optical signal of a plurality of initial optical signals to generate the first plurality of the optical signals or some optical signals of the first plurality of the optical signals, and the initial optical signals carry the first set of the values respectively.

In some embodiments, the system further comprises an optical encoding unit. The optical encoding unit is configured to encode and generate the initial optical signals according to the first set of the values.

In some embodiments, the weight module further comprises: at least one photoelectric conversion element connected to at least one output part of the directional coupler or the MMI respectively, and implementing photoelectric conversion of output light from the at least one output part to output a current signal; and at least one output part connected to the at least one photoelectric conversion element and outputting the current signal correspondingly.

In some embodiments, the photonic computing unit comprises one or more summing modules, and for output of two or more of the weight modules, a corresponding one of the summing modules is configured to generate an electrical signal, and the electrical signal represents a sum of multiplication operation results of two or more of the weight modules.

In some embodiments, the one or more summing modules comprise at least one summing module comprising: two or more input conductors, wherein each of the two or more input conductors is configured to carry an electrical signal in a form of an input current, an amplitude of the input current represents a result corresponding to an output part of the weight module, and at least one output conductor configured to carry and representing an electrical signal representing a sum of results corresponding to a form of an output current, wherein the output current is in proportion to a sum of the input current.

In some embodiments, each of the weight modules comprises one or more optical signal output parts, and the one or more optical signal output parts are configured to output light that is output from at least one output part of the directional coupler and/or the MMI.

In some embodiments, the first plurality of the optical signals are configured to represent one or more elements in a vector, and the weight module is configured to represent a plurality of elements in a matrix.

An embodiment of the present disclosure provides a photonic computing unit, configured to receive a first plurality of optical signals, wherein the first plurality of the optical signals represent a first set of values respectively, the photonic computing unit comprises a plurality of weight modules, the weight modules represent a plurality of predetermined values respectively, and each of the weight modules corresponds to one of the predetermined values; wherein each of the weight modules comprises: an optical input part configured to receive one optical signal of the first plurality of the optical signals, and at least one directional coupler, wherein each of the at least one directional coupler is designed to implement a predetermined split ratio, and/or at least one multimode interference coupler (MMI), wherein each of the at least one MMI is designed to implement a predetermined split ratio such that the weight module corresponds to one of the predetermined values, and is configured to implement a multiplication operation of one value corresponding to one optical signal inputted by the optical input part and one predetermined value corresponding to one weight module.

Each aspect, characteristic, and advantage of embodiments of the present disclosure will be specifically described in combination with attached drawings as follows. According to the following specific descriptions with the attached

DETAILED DESCRIPTION

Figure 1A:
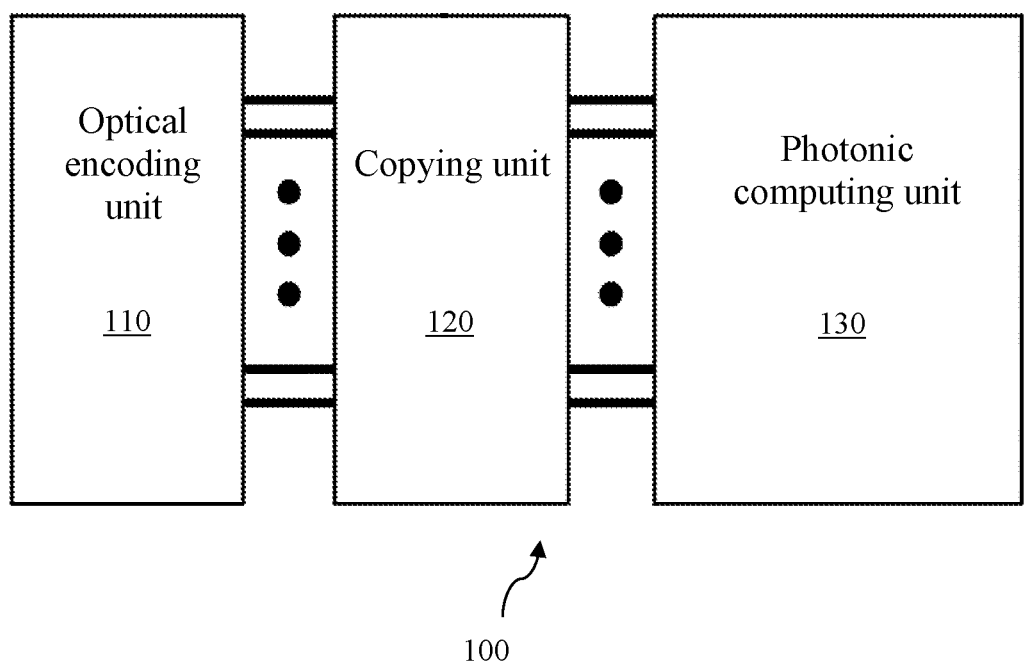
FIG. 1a illustrates a photonic computing system.

For convenience of understanding each aspect, characteristic, and advantage of the present disclosure technical solution, the present disclosure is specifically described in combination with the attached drawings as follows. It should be understood that the following various embodiments are only for examples and explanations but not for limiting the protective scope of the present disclosure.

Terminologies used in the specification are only fora purpose of describing specific embodiments and is not intended to limit the present disclosure. As used in the specification, singular forms of "one", "a/an" and "the" also include plural forms unless the context has another clear indication. It will be further understood that terminologies "comprise" and/or "include", when used in the specification, indicate existence of a characteristic, an entity, a step, an operation, an element and/or a part without excluding existence of one or more other characteristics, entities, steps, operations, elements, parts and/or a group thereof or addition of one or more other characteristics, entities, steps, operations, elements, parts and/or a group thereof. As used in the specification, a terminology "and/or" comprises any one or more and a combination of all in relatedly listed terms, and a phrase "at least one of A and B" refers to only A, only B, or both A and B.

In some conventional photonic computing, implementing a multiplication computation requires using a modulator. During an operation, the modulator needs external electrical signals, and a large-scale integration of modulators requires a lot of electrical interfaces. The modulator may also have issues of low modulation precision and large noise. Furthermore, when photonic computing is implemented, a network in which some photonic devices are interconnected requires higher optical coherence in the entire network.

The present disclosure discloses a photonic computing system, comprising: a photonic computing unit configured to receive a first plurality of optical signals, wherein the first plurality of the optical signals represent a first set of values respectively; wherein the photonic computing unit comprises a plurality of weight modules, the weight modules represent a plurality of predetermined values respectively, and each of the weight modules corresponds to one of the predetermined values; wherein each of the weight modules comprises: an optical input part (optical signal input part), wherein the optical input part is configured to receive one optical signal of the first plurality of the optical signals; and at least one directional coupler, wherein each of the at least one directional coupler is designed to implement a predetermined split ratio, and/or at least one multimode interference coupler (MMI), wherein each of the at least one MMI is designed to implement a predetermined split ratio such that the weight module corresponds to one of the predetermined values, and is configured to implement a multiplication operation of one value corresponding to one optical signal inputted by the optical input part and one predetermined value corresponding to one weight module.

In some embodiments, the photonic computing system also can comprise an optical encoding unit and an optical copying module.

Figure 1B:
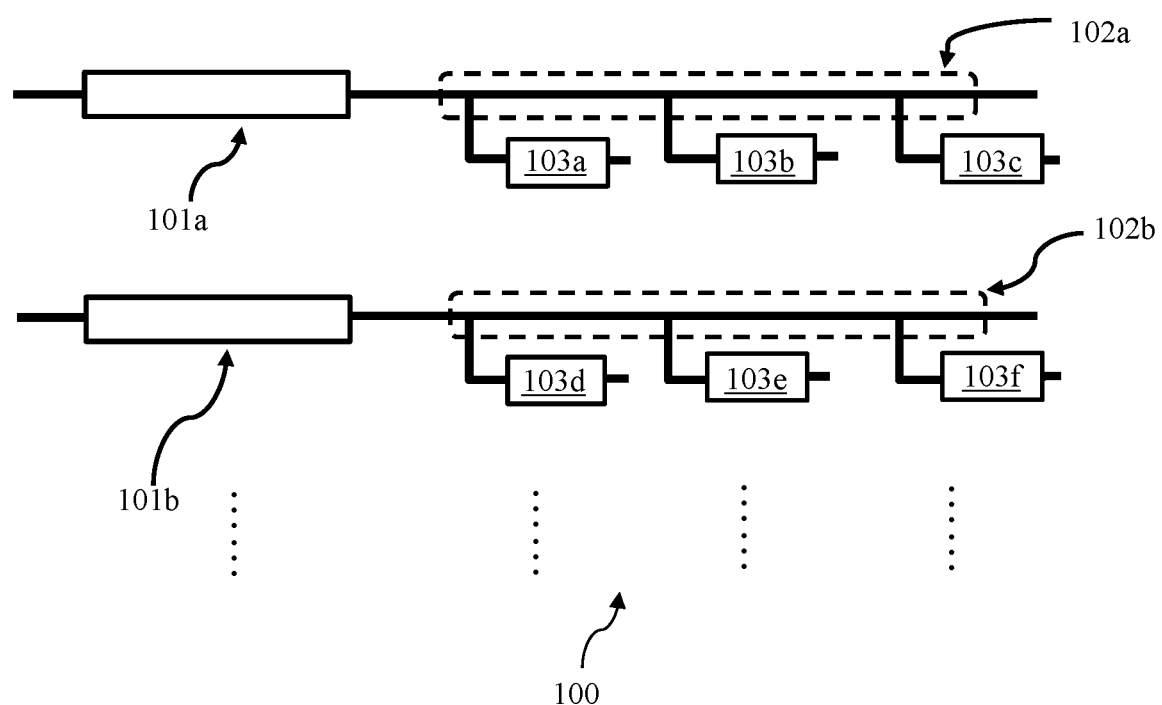
FIG. 1b illustrates a specific example of a photonic computing system.

FIG. 1a shows a photonic computing system comprising an optical encoding unit 110, a copying unit 120, and a photonic computing unit 130. Exemplarily, the optical encoding unit can comprise a plurality of modulators, the modulators can encode light according to values. FIG. 1b shows in modulators 101a, 101b in an optical encoding unit. The optical encoding unit is optically connected to the copying unit, the copying unit can comprise one or more copying modules. The copying modules, for example, comprise a beam splitter that can split light inputted into the copying module into two or more beams of light, namely, a "copying" operation is implemented to generate a light copy, and the light copy can serve as a first plurality of optical signals. FIG. 1b shows copying modules 102a, 102b in the copying unit. The photonic computing system further comprises a photonic computing unit configured to receive a first plurality of optical signals, and the first plurality of the optical signals represent a first set of values respectively. The photonic computing unit comprises a plurality of weight modules, for example, the weight modules 103a, 103b, 103c, 103d, 103e, 103f as shown in FIG. 1b. The weight modules 103a to 103f correspondingly represent a plurality of predetermined values, and each of the weight modules corresponds to one of the predetermined values. Each of the weight modules comprises: an optical input part configured to receive one optical signal of a first plurality of optical signals; at least one directional coupler, and/or at least one MMI (not shown in FIGS. 1a and 1b), wherein the directional coupler and the MMI are designed to implement a predetermined split ratio such that the weight module corresponds to one of the predetermined values and is configured to implement a multiplication operation of one value corresponding to the optical signal and one predetermined value corresponding to one weight module.

An output signal of the copying modules would not necessarily have the same amplitude as an input signal. For example, a light beam splitter (optical power separator) is used to evenly separate an input signal power between two output signals, and then each of the two output signals would have a power equal to or less than 50% of a power of the input signal.

Under some circumstances, the copying module or optical encoding unit can be omitted. Optical signals carrying values can be inputted into a photonic computing unit directly by some optical ports. Furthermore, optical signals output by the optical encoding unit can also be directly inputted into the photonic computing unit.

The optical encoding unit can encode light, such that optical signals represent values. The encoded optical signals can be inputted into the photonic computing unit to serve as a data source for computations. For example, the optical encoding unit can encode n values to generate corresponding n optical signals. Exemplarily, the photonic computing unit comprises a plurality of weight modules, and the n optical signals can be inputted respectively into n ones of the plurality of weight modules to perform a computation. The optical encoding unit can comprise for example a plurality of modulators modulating light based on electrical signals representing values to implement encoding and generate initial optical signals. In the photonic computing system, besides the above photonic computing unit, another photonic computing units can be included, for example, a second photonic computing unit and a third photonic computing unit, etc.. Modules in different photonic computing units can be different and can achieve different functions.

Besides the above weight modules (for corresponding to a plurality of predetermined values one by one), the photonic computing unit can also comprise another structure or photonic computing module able to implement photonic computing, for example, a photonic computing module performing computations by a Mach-Zehnder interferometer (MZI).

Figure 2:
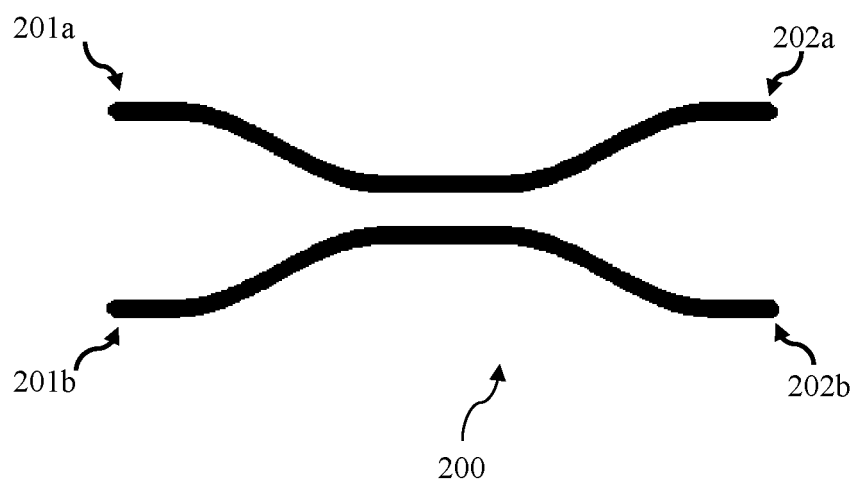
FIG. 2 illustrates a directional coupler as a weight module.

FIG. 2 shows a weight module 200 comprising two input parts 201a, 201b and two output parts 202a, 202b. The example shows a schematic view of one directional coupler as one weight module. The directional coupler in the figure comprises two input parts and two output parts. In the embodiment, any input part of the directional coupler can serve as an input part of the weight module or communicate with the input part of the weight module to receive optical signals. An input part of the weight module, for example the first input part 201a, receives an optical signal, and the optical signal corresponds to a value, for example x. The optical signals can have different intensity to correspond to different values. The weight module itself is designed to correspond to a predetermined value (predetermined weight) for example y, in particular, directional coupler is designed to implement a predetermined split ratio. In some embodiments, the weight module only requires one input part for inputting. Therefore, the weight module can only have one input part, only one input part of the directional coupler needs to be preserved. In some embodiments, the weight module can also have only one output part.

Exemplarily, receiving an output of at least one output part of the directional coupler can obtain a corresponding multiplication computation result of x and y. In the example, one directional coupler can achieve one weight module. The weight module is configured to implement a multiplication operation of a value represented by one inputted optical signal and a value represented by one weight module. The directional coupler is a passive optical element and does not require to use electrical signals to adjust light distribution as a modulation type MZI does, and thus a manufacturing process of the directional coupler is simple. In addition, a split ratio of the directional coupler is designed to relate to a predetermined value corresponding to the weight module such that the directional coupler can be applicable in a case where the weight module has a fixed value. Exemplarily, both the computing unit (photonic computing unit) or photonic processor required to implement a multiplication computation can comprise a plurality of weight units. According to demands, the photonic computing system can comprise a photonic computing unit or a photonic processor to achieve a function such as a multiplication computation.

In some embodiments, a coupling region of the directional coupler is designed to implement a predetermined split ratio and achieve different split ratios by designing a length, a waveguide width, a coupling gap width, a material, etc. of the coupling region structure (the directional coupler can be disposed to correspond to a required predetermined value) such that weight module is configured to correspond to a value. According to a predetermined value corresponding to a weight module, each directional coupler in the weight module is configured in a manufacturing stage to have a split ratio relating to the weight module.

In an embodiment shown in FIG. 2, in some embodiments, the predetermined value of the weight module can be a predetermined value of 0 to 1 and is defined as a ratio of output light of one of two output parts of the directional coupler (for example, an upper output part in FIG. 2) to inputted light of an input part, and the split ratio of the directional coupler is designed according to such rule. When the predetermined value is 1, a power ratio of the output light to the inputted light is 1. When the predetermined value is 0.3, the power ratio of the output light and the inputted light is 0.3. when optical signals of two output parts of the directional coupler are converted to electrical signals and a differential process is implemented to output electrical signals, a predetermined value of a negative number can also be defined. An example of the differential process can refer to the 595th paragraph to the 621th paragraph of Chinese patent No. CN113159305A, or the 566th paragraph to the 635th paragraph of US patent publication No. US20200250532A1.

When a plurality of weight modules exist, predetermined values of the weight modules are defined and a split ratio corresponding to the directional coupler is designed according to the same rule, and a range of the predetermined value (weight) representing the weight module is not limited within 0 to 1. For example, the photonic computing unit comprises four weight modules, and predetermined values (predetermined weight) that they need to represent are $b1=3$, $b2=4$, $b3=7$, $b4=8$. Each of the weight modules can be implemented by one directional coupler. According to the rule, ratios of an optical power of an output part of the directional coupler to an optical power of an input part of the directional coupler can be set to 0.3, 0.4, 0.7, and 0.8, namely, and split ratios corresponding to the directional coupler are 30%:70%, 40%:60%, 70%:30%, 80%:20%. Information of output light is obtained from the output part corresponding to the directional coupler, and according to a correspondence between the output light and the predetermined value, a result of a multiplication computation can be obtained based on a corresponding rule. As such, the weight module can implement a computation of a value represented by the inputted light and the predetermined value. Although the weight module is designed based on the predetermined value and represents multiplication of the predetermined value, for a plurality of weight modules, it can also represent a computation of a product of inputted light and each corresponding weight module multiplied by the same scaling factor. For example, when it is expected that the weight modules correspondingly represent $b1'=30$, $b2'=40$, $b3'=70$, $b4'=80$, a multiplication computation can still be completed by the weight modules manufactured correspondingly by the predetermined values $b1=3$, $b2=4$, $b3=7$, and $b4=8$. At this time, it is only required to re-define a correspondence between the predetermined value and the split ratio in a math rule, there is no need to change a structure of the weight module, and the multiplication computation implemented by the weight module is equivalent. Therefore, a multiplication operation of a predetermined value implemented by the weight module can be deemed to have equivalence of the above multiplication operation.

In some embodiments, a first plurality of optical signals can be configured to represent an element or a plurality of elements in a vector. The weight modules can be configured to correspond to the elements in the matrix to complete at least one part of multiplication operations of the matrix and vector. Of course, a complete operation of the vector and the matrix can be implemented by the above manner. Both the first plurality of optical signals, and the weight modules can represent elements in the vector and matrix. Therefore, these operations represent a set of universal linear operations capable of implementing various computations, including but not limited to: vector-vector dot product, vector-vector element-wise multiplication, vector-scalar element wise multiplication, or matrix-matrix element-wise multiplication. Here some examples show technologies and configurations for a vector-matrix multiplication. However, corresponding technologies and configurations can be applied to any one of these types of computations.

In some embodiments, a corresponding parameter of the optical signal can be obtained by detecting light of the optical output part of the directional coupler to obtain a multiplication result of the multiplication computation. Exemplarily, the weight module can comprise a photoelectric conversion element, and the photoelectric conversion element can comprise, for example, a photoelectric detector. The photoelectric detector can be a photodiode, a phototransistor, a photosensitive resistor, etc. to convert optical signals into electrical signals. The electrical signal represents a corresponding multiplication computation result. Exemplarily, optical signals of a first output part and a second output part of the directional coupler are converted into current signals first. Exemplarily, the electrical signal can serve as an output of the weight module, for example, a current signal converted and output by the photodiode.

In some embodiments, first, optical signals of the first output part and the second output part of the directional coupler are converted into current signals respectively, and then the current signals are processed by a differential process. The differential process can use, for example, a differential computation amplifier. Electrical signals after the differential process represent a result of the multiplication computation. Exemplarily, the weight module comprises a first photoelectric conversion element and a second photoelectric conversion element, and the first output part and the second output part of the directional coupler are coupled to the first photoelectric conversion element and the second photoelectric conversion element respectively. Output parts of the first photoelectric conversion element and the second photoelectric conversion element serve as two output parts of the weight module respectively. Namely, the weight module can have electrical signal output parts. The first output part and the second output part of the weight module can be a first electrical signal output part and a second electrical signal output part. In some embodiments, the first output part and the second output part of the directional coupler can serve as two output parts of the weight module respectively. Namely, the weight module outputs optical signals, and the two output parts of the weight modules are connected to photoelectric conversion elements respectively, the optical signals are converted into electrical signals and then are processed by a differential process.

Figure 3:
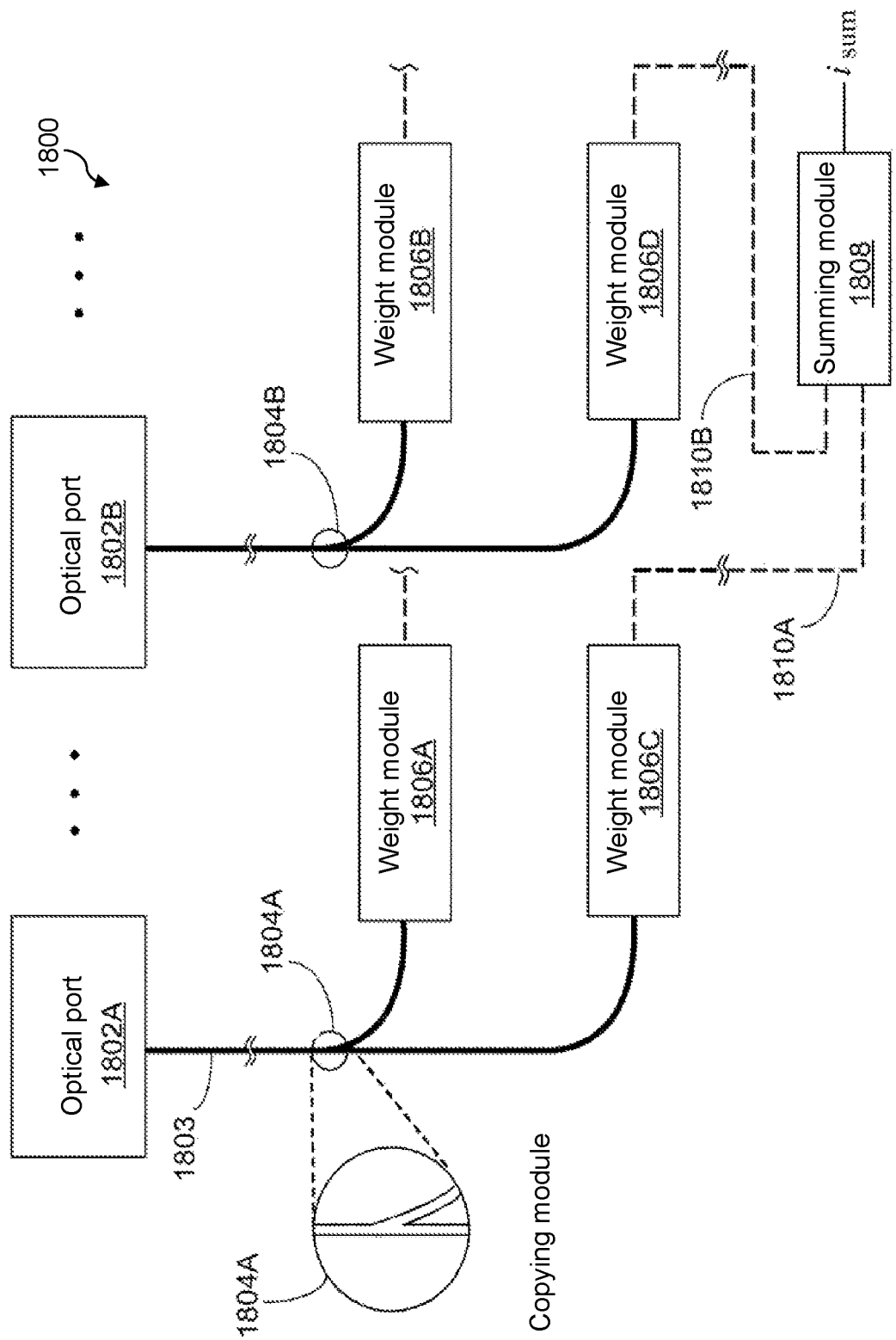
FIG. 3 illustrates a photonic computing system.

FIG. 3 shows an example of a photonic computing system. In the embodiment, optical signals to be computed can be inputted into a plurality of weight modules by a plurality of input ports (as shown in FIG. 3), or by a light transmission channel in another manner. The light transmission channel can be, for example, a light waveguide that can constitute a light waveguide unit.

With reference to FIG. 3, an example of the photoelectric computing system 1800 comprises a set of optical ports 1802A, 1802B providing optical signals. For example, in some embodiments, the optical port 1802A can comprise an optical input coupler providing optical signals coupled to an optical path 1803. In another embodiment, the optical port 1802A can receive optical signals coupled to the optical path 1803. Some embodiments can comprise a combination of a port coupling optical signals to the system 1800 and a source generating optical signals in the system 1800. The optical signals can comprise a light wave (for example, an electromagnetic wave, and a spectrum thereof comprises any wavelength ranging within about 100 nm to 1 mm) that has used or is using modulation in various types to perform modulation by information. The optical path 1803 can be defined by, for example, a guide mode based on a light waveguide (for example: a waveguide embedded in a photon integrated circuit (PIC) or an optical fiber) or be defined by a predetermined free space path between the optical port 1802A and another module of the system 1800.

In some embodiments, the photoelectric computing system 1800 is configured to perform a computation on an input value array that encodes optical signals correspondingly provided by the optical ports 1802A, 1802B. For example, for various machine learning applications based on a neural network, a computation can implement a vector matrix multiplication (or vector-by-matrix multiplication), and the input vector is multiplied by a matrix to generate an output vector as a result. The optical signals can represent elements of the vector, and can only include a subset of selected elements of the vector. For example, for some neural network modules, a size of a matrix in a computation can be greater than a size of a matrix in a hardware system (for example, an engine or auxiliary processor of a larger system) that can be loaded to a vector matrix multiplication implementing a computation. Therefore, a part of implementing the computation can relate to dividing the matrix and the vector into smaller segments that can be provided to the hardware system respectively.

The module shown in FIG. 3 can be a part of a larger system that implements a vector matrix multiplication to a comparatively large matrix (or sub-matrix), for example, a matrix of 64×64 elements. However, for a purpose of explanations, a module would be described in the context of using a matrix of 2×2 elements to implement a vector matrix multiplication of an exemplary computation. A module referred to in the example would include two copying modules 1804A, 1804B, four weight modules 1806A, 1806B, 1806C, 1806D, and two summing modules. Only one summing module 1808 is shown in FIG. 3. These modules would multiply an input vector $$\bar{x} = \begin{bmatrix} x_A \\ x_B \end{bmatrix}$$

by a matrix $$\bar{\bar{M}} = \begin{bmatrix} M_A & M_B \\ M_C & M_D \end{bmatrix}$$

to generate an output vector $$\bar{y} = \begin{bmatrix} y_A \\ y_B \end{bmatrix}.$$

For the vector matrix multiplication $\bar{y}=\overline{M}\bar{x}$, each of two elements of the output vector $\bar{y}$ can be represented by different equations as follows.

$$y_A=M_A x_A+M_B x_B$$

$$y_B=M_C x_A+M_D x_B$$

These equations can be divided into separate steps that can use a basic set of operations implemented in the system 1800: "copying operations, multiplication operations, and summing operations. In these equations, each element of the input vector appears twice, and therefore there are two "copying operations. Also, there are four multiplication operations and two summing operations. For a system utilizing a larger matrix to implement a vector matrix multiplication, an amount of implemented operations would be greater and a matrix shaped other than a square matrix (namely, a column number is different from a row number) would be used. A number of relative examples of each operation would be different.

In this example, the copying modules 1804A, 1804B are utilized to implement a "copying operation. Elements of the input vector $x_A$, $x_B$ are represented by encoded values of the optical signals from the optical ports 1802A, 1802B, respectively. Each of these values is used in the two equations. Therefore, each value is copied to provide two obtained copies to different corresponding weight modules. For example, as the following more detailed description, an encoding value in a specific timeslot, that has been modulated as a light wave including a power from a set of power levels or a light wave including a duty ratio from a set of duty ratios, can be used. The value can be copied by "copying optical signals of the encoding value. An optical signal encoded to have a value representing the element $x_A$ is copied by the copying module 1804A, and an optical signal encoded to have a value representing the element $x_B$ is copied by the copying module 1804B. Each copying module, for example, can be implemented by an optical power separator. The optical power separator, for example, is a waveguide light separator coupling a guide mode in an input waveguide to each of two output waveguides on a Y-shaped separator. The Y-shaped separator gradually (for example, adiabatically) separates a power. Alternatively, the optical power separator, for example, is a free space light beam separator utilizing a dielectric interface or thin film including one or more layers to transmit and reflect two output light beams out from an inputted light beam respectively.

In the present application, the description, that the optical signal encoded to have a value representing the element $x_A$ is copied by the copying module 1804A, means that a plurality of signal copies representing the element $x_A$ are produced based on an input signal, the output signal of the copying module 1804A would not necessarily have an amplitude the same as that of the input signal. For example, when the copying module 1804A evenly separates an input signal power between two output signals, then each of the two output signals would have a power equal to or less than 50% of the input signal power. The two output signals are copies for each other, and an amplitude of each output signal of the copying module 1804A is different from an amplitude of the input signal. Furthermore, in some embodiments having a set of copying modules configured to copy provided optical signals or optical signal subsets, each individual copying module would not necessarily evenly separate a power between the produced copies. However, the set of the copying modules can be commonly configured to provide a copy having a power basically the same as a power of an input of a downstream module (for example: downstream weight module).

In this embodiment, the multiplication operation is implemented by four weight modules 1806A, 1806B, 1806C and 1806D. For each copy of an optical signal, a weight module multiplies a copy of the optical signal by a matrix element value.

The optical signal encoded to have the vector element $x_A$ can use amplitude modulations in different forms for encoding. The amplitude of the optical signal can correspond to a specific instantaneous power level PA of a physical light wave in a specific timeslot, or can correspond to a specific energy EA (total energy generated according to the power integrated over time) of the physical light wave on the specific timeslot. For example, a power of a laser source can be modulated to have a specific power level from a predetermined set of power levels. In some embodiments, operating an electric circuit around an optimized operation point would be useful. Therefore, instead of changing a power in many possible power levels, an optimized "on" power level is used, and a signal is modulated to be "on" and "off" (at a zero power) relative to specific parts of a timeslot. A timeslot in which the power is at an "on" level corresponds to a specific energy level. Any one of these specific values of the power or energy can be mapped to a specific value (using a linear or nonlinear mapping relationship) of the element $x_A$. After the signal is in an electrical domain, an actual integration over time generating a specific total energy level can occur downstream from the system 1800, as the following more detailed descriptions.

Furthermore, a terminology "amplitude" can refer to an amplitude of a signal represented by an instantaneous or integrated power in a light wave, or can equivalently refer to "an amplitude of an electromagnetic field" of a light wave. This is because the electromagnetic field amplitude and the signal amplitude has a well-defined relationship (for example: by integrating an intensity of an electromagnetic field (in proportion to the square of the amplitude of the electromagnetic field) on a transverse dimension of a guide mode or a free space light beam to generate instantaneous power). This results in a relationship between modulating values, because a modulator modulating an amplitude of an electromagnetic field by a specific value $\sqrt{M}$ can also be deemed to modulate a signal amplitude based on a power by a corresponding value M (because the optical power is proportional to the square of the electromagnetic field amplitude).

In this embodiment, a summing operation is implemented by two summing modules, and the summing module 1808 (as shown in FIG. 3) is configured to implement a summing operation in an equation for computing an output vector element $y_B$. The corresponding summing module (not shown) is configured to implement a summing operation in an equation for computing an output vector element $y_A$. The summing module 1808 generates an electrical signal, and the electrical signal represents a sum of results of two weight modules 1806C, 1806D. In this example, the electrical signal is in a form of current $i_{sum}$, and is in proportion to a sum of powers of output optical signals generated by the weight modules 1806C, 1806D. In some embodiments, a summing operation generating the current $i_{sum}$ is implemented in an optoelectronic domain, and is implemented in an electrical domain in another embodiment. Alternatively, some embodiments can perform the summing operation by using an optoelectronic domain applied to some summing modules and perform the summing operation by using an electrical domain applied to other summing modules.

In an embodiment of implementing a summing operation in an electrical domain, the summing module 1808 can be implemented by the following: (1) ftwo or more input conductors, wherein each input conductor carries an input current, an amplitude of the input current represents a result of one of the weight modules, and (2) at least one output conductor carrying a current as a sum of input currents. For example, if a conductor is conductive wires meeting at a node, such condition occurs. For example (not bound by a theory), such relationship can be understood based on Kirchhoff's current law, the law points out that a current flowing into the node is equal to a current flowing out from the node. For these embodiments, signals 1810A, 1810B provided to the summing module 1808 are an input current that can be generated by a photoelectric detector. The photoelectric detector is a part of the weight module. The weight module generates a corresponding photocurrent, and an amplitude of the photocurrent is in proportion to a power of received optical signals. Then, the summing module 1808 provides an output current $i_{sum}$. Then, an instantaneous value of the output current or an integrated value of the output current can be used to represent a quantitative value of sum.

In an embodiment of a summing process performed in an optoelectronic domain, the summing module 1808 can be achieved by a photoelectric detector (for example: photodiode). The photoelectric detector receives optical signals correspondingly generated by different weight modules. For these embodiments, signals 1810A, 1810B provided to the summing module 1808 are inputted optical signals, each of the inputted optical signals comprises a light wave, and a power thereof represents a result of one of the weight modules. The output current $i_{sum}$ in this embodiment is a photocurrent generated by the photoelectric detector. Because wavelengths of the light waves are different (for example: the wavelengths are sufficiently different such that no obvious constructive interference or destructive interference occurs therebetween), the photocurrent would be in proportion to a sum of powers of received optical signals. The photocurrent is also basically equal to a sum of currents, each current would result in each detected optical power detected by separate equivalent photoelectric detectors. Wavelengths of the light waves are different but sufficiently approximate to each other such that the photoelectric detector basically has the same response (for example: a wavelength of a basically flat detective bandwidth of the photoelectric detector). As described above, summing in an electrical domain in a current summing operation can achieve a simpler system framework by preventing requirement for a plurality of wavelengths.

Figure 4:
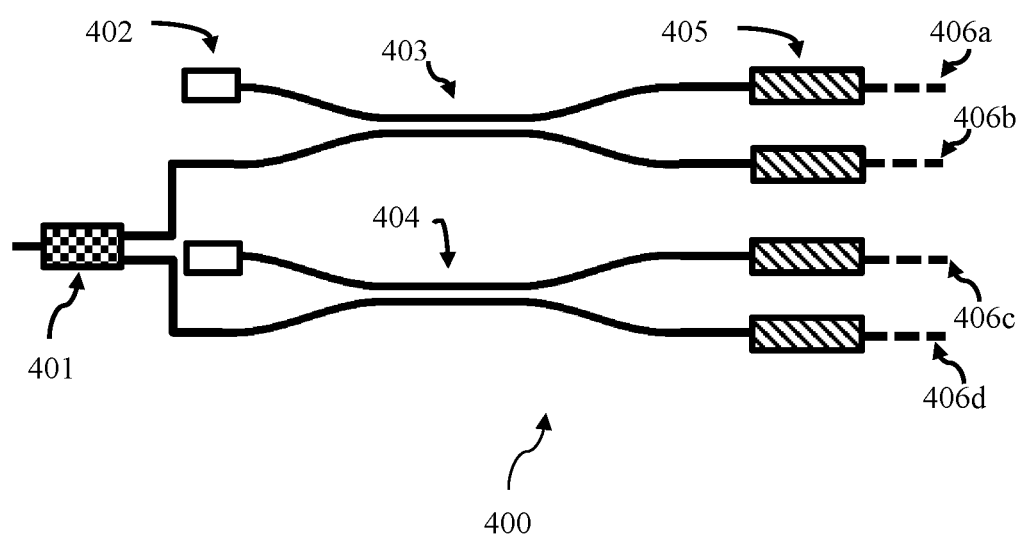
FIG. 4 illustrates the weight module comprising two directional couplers.

In some embodiments, one weight module can comprise a plurality of directional couplers. For example, the weight module 400 as shown in FIG. 4 comprises two directional couplers and a beam splitter 401. The beam splitter 401 can perform splitting 50%-50% of light (for example 3 dB beam splitter). However, the split ratio is not limited thereby. As shown in the figure, an input part of the 3 dB beam splitter serves as an input part of the weight module 400, or, the input part of the weight module 400 is optically connected to the input part of the beam splitter to input an optical signal representing a value. The optical signal is divided by the 3 dB beam splitter into two to enter two directional couplers respectively. According to the predetermined value corresponding to the weight module, the split ratio of the first directional coupler, the split ratio of the second directional coupler, and the split ratio of the directional coupler, are designed to relate to the predetermined value of the weight module. The directional coupler can be changed physically structurally by designing a length, a waveguide width, a coupling gap width, material, etc. of the coupling region structure. In FIG. 4, one or more output parts of two directional couplers can be selected to serve as corresponding one or more output parts of the weight module. Of course, a weight module can also comprise directional couplers of another number, for example three, four, but is not limited thereto. Furthermore, a connection way of the directional coupler can be changed to implement suitable light splitting, for example, an output of a directional coupler serves as an input of another directional coupler.

In addition, as shown in FIG. 4, for an unnecessary terminal of a waveguide, a light absorbing structure can be used to absorb remaining light in the waveguide. For example, dummy photoelectric detectors 402 can be used to convert unnecessary optical signals into electrical signals, but the electrical signals perform no other function.

In some embodiments, with reference to FIG. 4, the weight module further comprises a photoelectric conversion element 405, for example, a photoelectric detector. Each optical output part of two directional couplers is connected to the photoelectric conversion element. The weight module comprises four electrical output ports. A first directional coupler 403 corresponds to a first electrical output port 406a and a second electrical output port 406b, and a second directional coupler 404 corresponds to a first electrical output port 406c and a second electrical output port 406d. First, currents of the two first electrical output ports are summed and currents of the two second electrical output ports are summed. Then, the summed results thereof are processed by a differential process, and an obtained corresponding electrical signal can correspondingly represent a result of a multiplication operation of one inputted optical signal and the weight module. Optionally, in some embodiments, in electrical output ports of the weight module, currents of a plurality of first ports are summed, and currents of a plurality of second ports are summed, and an electrical signal differentialized after summing represents a result of a multiplication operation of the inputted optical signal and the weight module.

In some embodiments, the weight module has optical signal output. Output of optical signals of the weight modules can be further optically processed or photoelectrically converted. Exemplarily, the output part thereof is connected to an optical nonlinear module to process the output optical signals of the weight modules to achieve another conversion mathematically, for example nonlinear conversion.

In some embodiments, the weight module can comprise a photoelectric conversion element configured to convert optical signals into electrical signals. For example, the photoelectric conversion element comprises a photodiode, and at this time, the weight module has electrical signal output.

In an exemplary embodiment, weight modules can be applied to a matrix computation, and the matrix computation comprises, for example, multiplication of a vector and a matrix and multiplication of a matrix and a matrix. These computations can be generally divided into multiplication operations and summing operations between elements. Exemplarily, in an embodiment, one or more elements of a matrix can be implemented by the weight module, and the weight module can be achieved by employing a weight module of each embodiment of the present disclosure. During a matrix computation, for example an operation of a vector and a matrix, it is required to perform a multiplication computation to an element (a weight) and another input value in the matrix, make an optical signal correspond to an input value, and make a matrix element correspond to a weight module to complete the multiplication computation between a value corresponding to the element and the input value. Exemplarily, for a matrix of 8×8, the matrix is multiplied by a vector of eight elements, each element of the vector needs to be used repeatedly for eight times to perform multiplication computations with eight elements in the matrix. For this, an optical signal (optical signal power) representing an element a of the vector can be processed with an optical power distribution, for example, the optical power of the optical signal is distributed evenly to 8 parts. Namely, one element in the vector can be represented by eight optical signal copies. A copying module can be used to generate optical signal copies (light copies). The copying module, for example, comprises a beam splitter or a combination of beam splitters generating the optical signal copy, a plurality of copying modules can constitute a copying unit. For an example of completing a full computation of the vector and the matrix, a matrix of 8×8 requires sixty-four weight modules, eight elements of the vector need to be represented by total sixty-four optical signals (because each element of the vector needs to be used repeatedly for eight times). During a computation, the above sixty-four optical signals are inputted into the sixty-four weight modules respectively to implement a multiplication computation. Of course, in the matrix multiplication operation, a weight module with a predetermined value can also be adopted to implement some multiplication operations in the matrix, an adequate number of the above weight modules with predetermined values are configured according to demands. Each of the weight modules can comprise different types of devices.

In some embodiments, the photonic computing unit can comprise a plurality of copying modules, namely, the copying modules can be a part of the photonic computing unit. In some embodiments, the copying modules can also be independent from the photonic computing unit, and the copying modules can be a part of the copying unit. Namely, the copying unit comprises a plurality of copying modules, and the copying unit is optically connected to the photonic computing unit to transmit the light copy to the photonic computing unit.

Figure 5:
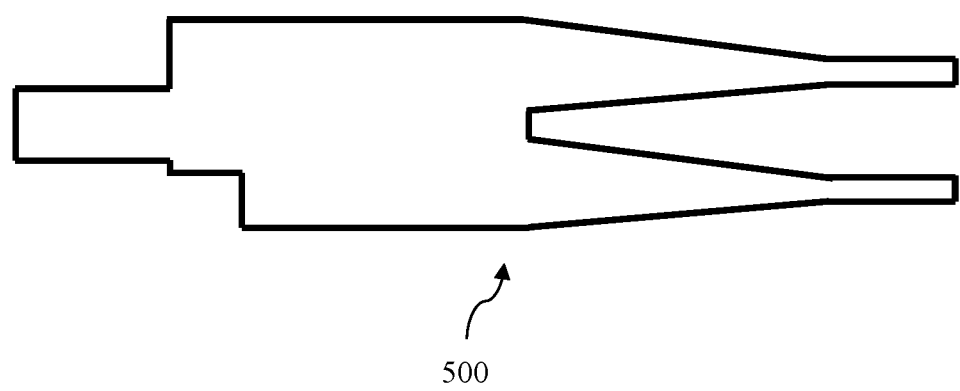
FIG. 5 illustrates the weight module comprising a multimode interference coupler (MMI)
Figure 6:
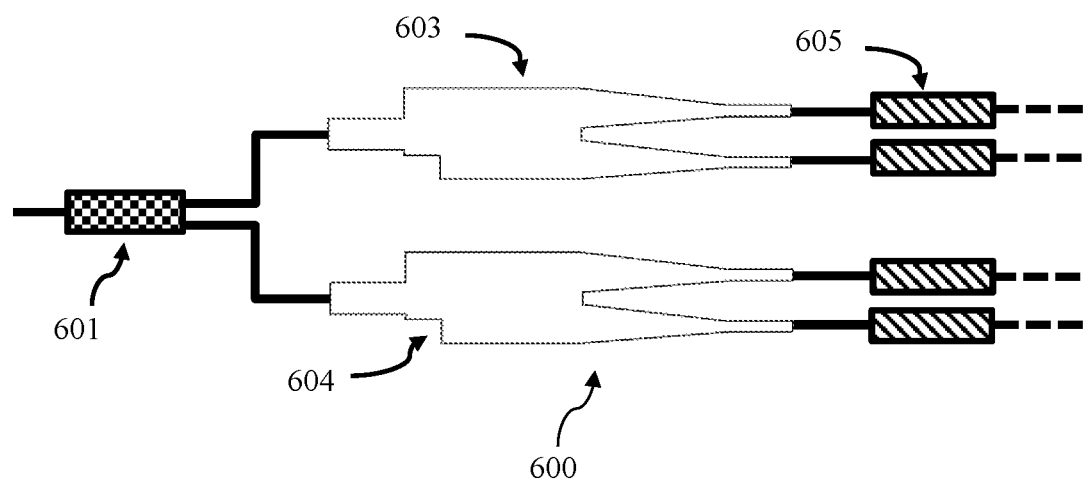
FIG. 6 illustrates the weight module comprising two MMIs.

With reference to FIGS. 5 and 6, a multimode interference coupler (MMI) can be used to replace the above directional coupler. Exemplarily, one weight module can comprise one or more MMIs, and the MMIs can be designed to have different light distribution proportions. For example, a coupling region (interference region) of the MMI can be designed, and the MMI can be designed to be asymmetrical to achieve a light distribution in any proportion. FIG. 5 shows a weight module 500 comprising an MMI, and input parts and output parts of the weight module 500 can correspond to input parts and output parts of the MMI. Therefore, the weight module has one optical signal input part and two optical signal output parts. In FIG. 6, the weight module 600 comprises a first MMI 603, a second MMI 604, a beam splitter 401, and four photoelectric detectors 605. The weight module 600 has one optical input part and four electrical signal output parts. Inside the weight module, both two optical output parts of each MMI are connected to the photoelectric detector. Finally, electrical signals are output from the weight module by the electrical signal output parts.

In some embodiments, one weight module can comprise at least one of a directional coupler and a MMI, and a number thereof can be one or plural. Structures of the directional coupler and the MMI can be designed to achieve a predetermined split ratio such that they can relate to predetermined values corresponding to the weight modules. The directional coupler and MMI are passive devices and does not require to use external electrical signals to adjust the split ratio, and thus a manufacturing process thereof of the directional coupler is simple. In a addition, a split ratio of the directional coupler is designed to relate to a predetermined value corresponding to a weight module such that the directional coupler can be applicable in a case where a weight module has a predetermined fixed value. Using the above light splitting device to implement passive light splitting, in photonic computing, has advantages of stable light splitting, interference resistance, low nonlinear effect, and no static power consumption. When light is inputted into the weight module, a value of a corresponding weight module is represented according to the passive device such as the directional coupler and the MMI as a light splitting device. The above light splitting device achieves passive light splitting, without implementing a light splitting computation by electric modulation, which prevents excessive electrical interfaces.

One weight module can have one or more output parts. According to the demand, output parts can comprise electrical signal output parts, and also can comprise optical signal output parts.

In some embodiments, the output part of the weight module can output optical signals. Namely, the weight module comprises an optical signal output part, the weight module has optical signal output. One or more output parts of one weight module, for example, can be an output part of one or more directional couplers, can be an output part of the MMI, and can be a directional coupler. The output part of the MMI can be coupled to the output part of the weight module by a waveguide or another optical element. Optical signal information of one or more output parts of the weight module is read and further processed such that a result of the multiplication computation can be obtained.

In some embodiments, the output part of the weight module can output electrical signals. Namely, the weight module comprises an electrical signal output part. Exemplarily, the weight module can comprise a photoelectric conversion element that can represent a computing result of the weight module by detecting and converting light of the optical output parts of the directional coupler and the MMI into electrical signals. The photoelectric conversion element can comprise, for example, a photoelectric detector. The photoelectric detector can be a photodiode, phototransistor, a photosensitive resistor, etc., converting an optical signal into an electrical signal, and representing a corresponding multiplication computation result by the electrical signal. Exemplarily, an electrical signal serves as an output of the weight module, for example, a current signal output by a photodiode. One weight module can only have one electrical signal output part, and also can have a plurality of electrical signal output parts. Electrical signals of the electrical signal output parts of the weight module can be processed to obtain a multiplication computation result. Exemplarily, light output from at least one optical output part of the directional coupler or the MMI is processed by a photoelectric conversion of output current signals. The output current signals are processed in an electrical domain to read a result of a corresponding multiplication computation. Exemplarily, during a signal process in the electrical domain, for example, a differential computation amplifier can be used to implement the process.

In some embodiments, a summing module is employed to sum currents of first electrical signal output parts of the weight modules, then sum currents of second electrical signal output parts of the weight modules, and then a differential process is implemented. A result by the differential process represents a sum of products of the weight modules. For example, each of four weight modules comprises a first electrical signal output part and a second electrical signal output part, and a summing module receives electrical signals (for example, optical current signals) from the first electrical signal output parts of the four weight modules to implement summing, a result is a current S1, and then currents of the second electrical signal output parts are summed and a result is current S2. Then, the currents S1, S2 are processed by a differential process to obtain a sum of the results corresponding to the weight modules.

A person of ordinary skill in the art should understand that the above disclosure are only embodiments of the present disclosure and cannot limit claim scopes protected by a patent claimed by the present disclosure. Equivalent according to the embodiments of the present disclosure are scopes included by claims of the present disclosure.

The invention claimed is:

1. A photonic computing system, comprising:
    a photonic computing unit configured to receive a first plurality of optical signals, wherein the first plurality of the optical signals represent a first set of values respectively;
    wherein the photonic computing unit comprises a plurality of weight modules, the weight modules represent a plurality of predetermined values respectively, and each of the weight modules corresponds to one of the predetermined values;
    wherein each of the weight modules comprises:
        an optical input part, configured to receive one optical signal of the first plurality of the optical signals, wherein the one optical signal represents one value of the first set of values; and
        one or both of at least one directional coupler or at least one multimode interference coupler (MMI), wherein each of the at least one directional coupler or each of the at least one MMI is designed to implement a predetermined split ratio such that the weight module corresponds to the one of the predetermined values, and is configured to implement a multiplication operation of the one value represented by the one optical signal received by the optical input part and the one predetermined value corresponding to the weight module.

2. The system according to claim 1, wherein the one or both of the at least one directional coupler or the at least one MMI are configured in a manufacturing stage to have a split ratio relating to the predetermined value of the weight module according to the predetermined value corresponding to the weight module.

3. The system according to claim 1, wherein the system further comprises an optical encoding unit, and the optical encoding unit is configured to encode light to generate the first plurality of the optical signals according to the first set of the values.

4. The system according to claim 1, wherein the system further comprises a plurality of copying modules configured to copy at least one initial optical signal of a plurality of initial optical signals to generate the first plurality of the optical signals or some optical signals of the first plurality of the optical signals, and the initial optical signals carry the first set of the values respectively.

5. The system according to claim 4, further comprising an optical encoding unit, wherein the optical encoding unit is configured to encode light to generate the initial optical signals according to the first set of the values.

6. The system according to claim 1, wherein the weight module further comprises:
    at least one photoelectric conversion element connected to at least one output part of the directional coupler or the MMI respectively, and performing a photoelectric conversion on output light from the at least one output part to output a current signal; and
    at least one output part of the weight module connected to the at least one photoelectric conversion element and outputting the current signal correspondingly.

7. The system according to claim 1, wherein the photonic computing unit comprises one or more summing modules, and based on output of two or more of the weight modules, a corresponding one of the summing modules is configured to generate an electrical signal, and the electrical signal represents a sum of multiplication operation results of the output of two or more of the weight modules.

8. The system according to claim 7, wherein the one or more summing modules comprise at least one summing module comprising:
    two or more input conductors, wherein each of the two or more input conductors is configured to carry an electrical signal in a form of an input current, an amplitude of the input current represents a result output by an output part of the weight module, and
    at least one output conductor configured to carry and represent an electrical signal representing a sum of the input current in a form of an output current, wherein the output current is in proportion to the sum of the input current.

9. The system according to claim 1, wherein each of the weight modules comprises one or more optical signal output parts, and the one or more optical signal output parts are configured to output light that is output from at least one output part of the one or both of the directional coupler or the MMI.

10. The system according to claim 1, wherein the first plurality of the optical signals represent one or more elements in a vector, and the weight module is configured to represent a plurality of elements in a matrix.

11. A photonic computing unit, configured to receive a first plurality of optical signals, wherein the first plurality of the optical signals represent a first set of values respectively, the photonic computing unit comprises a plurality of weight modules, the weight modules represent a plurality of predetermined values respectively, and each of the weight modules corresponds to one of the predetermined values;
    wherein each of the weight modules comprises:
        an optical input part configured to receive one optical signal of the first plurality of the optical signals, wherein the one optical signal represents one value of the first set of values, and
        one or both of at least one directional coupler or at least one multimode interference coupler (MMI), wherein each of the at least one directional coupler or each of the at least one MMI is designed to implement a predetermined split ratio such that the weight module corresponds to the one of the predetermined values, and is configured to implement a multiplication operation of the one value represented by the one optical signal received by the optical input part and the one predetermined value corresponding to the weight module.

* * * * *